(12) United States Patent
Sidon

(10) Patent No.: US 7,958,270 B2
(45) Date of Patent: Jun. 7, 2011

(54) DISTRIBUTION OF FILES FROM MOBILE DEVICES

(76) Inventor: Laurent Frederick Sidon, Los Angeles, CA (US)

(*) Notice: Subject to any disclaimer, the term of this patent is extended or adjusted under 35 U.S.C. 154(b) by 609 days.

(21) Appl. No.: 11/423,151

(22) Filed: Jun. 9, 2006

(65) Prior Publication Data

US 2007/0288551 A1    Dec. 13, 2007

(51) Int. Cl.
*G06F 15/16*    (2006.01)

(52) U.S. Cl. ........ 709/248; 709/206; 709/213; 709/216; 709/218; 709/219

(58) Field of Classification Search .................. 709/203, 709/206, 218, 248, 213, 216, 219
See application file for complete search history.

(56) References Cited

U.S. PATENT DOCUMENTS

| | | | |
|---|---|---|---|
| 6,393,470 B1 | 5/2002 | Kanevsky et al. | |
| 7,761,816 B2 | 7/2010 | Goldfarb et al. | |
| 2002/0120696 A1* | 8/2002 | Mousseau et al. | 709/206 |
| 2002/0184318 A1* | 12/2002 | Pineau | 709/206 |
| 2003/0184793 A1* | 10/2003 | Pineau | 358/1.15 |
| 2004/0103174 A1* | 5/2004 | Balducci et al. | 709/221 |
| 2004/0202291 A1 | 10/2004 | Skinner et al. | |
| 2004/0225731 A1* | 11/2004 | Piispanen et al. | 709/224 |
| 2005/0010694 A1 | 1/2005 | Ma et al. | |
| 2005/0036034 A1* | 2/2005 | Rea et al. | 348/207.1 |
| 2005/0064852 A1 | 3/2005 | Baldursson | |
| 2005/0076058 A1 | 4/2005 | Schwesig et al. | |
| 2006/0215827 A1 | 9/2006 | Pfleging et al. | |
| 2006/0224632 A1* | 10/2006 | Franz | 707/104.1 |
| 2007/0190983 A1 | 8/2007 | Goldfarb et al. | |
| 2007/0270137 A1* | 11/2007 | Feng et al. | 455/414.4 |
| 2008/0015952 A1 | 1/2008 | Medved et al. | |
| 2008/0026732 A1 | 1/2008 | Goldfarb | |
| 2008/0215672 A1* | 9/2008 | Kloba et al. | 709/203 |

OTHER PUBLICATIONS

Office Action, U.S. Appl. No. 11/468,320, dated Mar. 1, 2010.
Office Action issued from U.S. Appl. No. 11/468,320, Dated: Apr. 29, 2009.

* cited by examiner

*Primary Examiner* — Djenane M Bayard
(74) *Attorney, Agent, or Firm* — Hamilton, Brook, Smith & Reynolds, P.C.

(57) ABSTRACT

Techniques for seamless distribution of files stored in folders, in an Internet-enabled mobile device to one or more recipients including replicating and mapping a folder structure of the mobile device and the folder structure of the remote server, transferring files between the mobile device and the remote server using an Internet connection, and seamlessly distributing the files on the remote server to file recipients. Preselected email addresses can be associated with each folder, so that the files are automatically distributed to the pre-selected email addresses. Preferably, the user can configure folders using a Web user interface on a computer and transfer files in multiple folders on the mobile device to the preselected email addresses automatically after a trigger event.

34 Claims, 15 Drawing Sheets

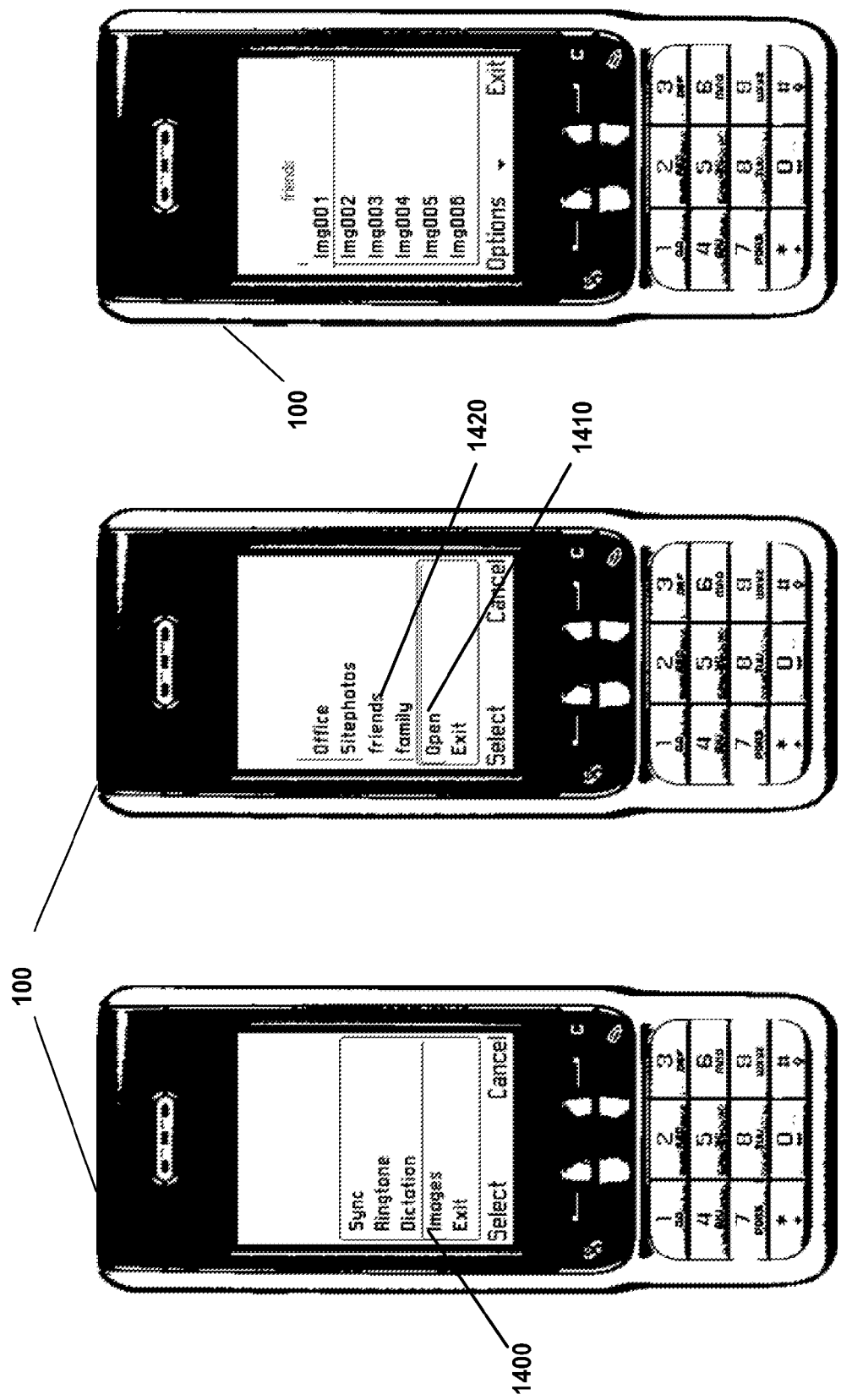

DISTRIBUTION OF FILES FROM MOBILE DEVICES

CROSS-REFERENCE TO RELATED APPLICATIONS

Not applicable

FEDERALLY SPONSORED RESEARCH OR DEVELOPMENT

Not applicable

PARTIES TO A JOINT RESEARCH AGREEMENT

Not applicable

REFERENCE TO A SEQUENCE LISTING, A TABLE, OR A COMPUTER LISTING

Not applicable

BACKGROUND OF THE INVENTION

1. Field of the Invention

The invention relates to the field of data sharing and distribution systems wherein computers located at distant sites transfer data to each other via a wireless communications network (e.g., a wide area network or a wireless Internet). More particularly, the invention relates to the field of sharing and distribution of files stored in a mobile device to one or more recipients.

2. Description of the Related Art

Mobile devices like mobile phones, personal digital assistants (PDAs), smart phones, etc. have become increasingly smaller, more powerful, and capable of rich functionality. Many mobile devices now function like computers and are capable of storing files and software applications in their memory. Mobile phones allow transmitting and receiving of data via wireless telecommunication networks, as well as through the Internet.

Mobile phones may connect with a cellular network to exchange images using the Multimedia Messaging Service (MMS) offered by some cellular network operators. The disadvantage of MMS is that only one image at a time can be sent to one recipient (the process of sending an MMS message has to be repeated for each image and for each recipient). Also, MMS deals with exchange of image files only, the user interface is inconvenient, and MMS does not enable convenient distribution of files and notifications to multiple recipients.

U.S. Pat. No. 6,393,470 teaches a method for freeing storage of portable devices when the portable device becomes full. This task is accomplished using a network of servers that communicate via wireless channels with the portable devices. That is, if a server detects that a device is nearly full with stored captured images, this server moves stored images to a storage server without interrupting possible owner actions with the device. The owner can download all moved images/data from a storage server to his/her computer after returning to a home/office/hotel. However, this patent does not describe any convenient mechanism to transfer and distribute files to selected recipients, not when the memory is full, but at the discretion of the user.

US Patent Application Publication No. 2005/0010694 teaches a method for uploading photographic data from a wireless device, where the process includes the receiving of a data packet from a mobile phone having digital photograph data and a header configured under a first format with the communication interface, re-configuring the received data packet under a second format with the communication interface, and transmitting the re-configured data packet to a destination device for facilitating communication between a cell phone and other devices via a communication interface. This publication also does not describe any convenient mechanism to transfer and distribute files to selected recipients. Another disadvantage of the method disclosed in this publication is that this method needs a separate communication interface, which makes operation of the method unnecessarily complex.

US Patent Application Publication No 2004/0202291 teaches a method for recording and storing a voice recording into a removable memory unit of a wireless mobile phone, and then electronically transferring the voice recording from the wireless mobile phone to an external target device. This publication also does not describe any convenient mechanism to transfer and distribute files to selected recipients.

US Patent Application Publication No 2005/0076058 teaches a method and apparatus for implementing an interface for media publishing. The method of publishing media data includes accessing a media interface of a media device, capturing media data, storing the captured media data in storage of the media device, modifying the captured media data, and publishing the modified media data to a network server, wherein the capturing, modifying, and publishing are performed using the media interface. However, this publication also does not describe any convenient mechanism to transfer and distribute files to selected recipients.

In view of the related art described above, it will be desirable to have a convenient mechanism to transfer and distribute files to selected recipients. It will also be desirable to have the ability to associate pre-selected recipients with a folder, thereby enabling all the files in the folder stored in a mobile device to be distributed to the pre-selected recipients either automatically, based on a trigger event or a user-defined trigger event, or with a one step menu selection on the mobile device. It will also be desirable to have the ability to configure mobile device folders (associate pre-selected recipients with folders) and other mobile device settings using a computer having a convenient user interface (for example, without limitation, the user interface of a desktop computer, a laptop computer, or a tablet computer).

SUMMARY OF THE INVENTION

An object of the present invention is to enable a user to seamlessly distribute files between a mobile device (for example, without limitation, a PDA (personal digital assistant), a cellular phone, a smart phone, etc.) and one or more recipients in a convenient fashion.

Another object of the present invention is to allow association of pre-selected recipients with a folder, thereby enabling all the files in the folder stored in a mobile device to be distributed to the pre-selected recipients automatically after a trigger event (for example, without limitation, a one-step menu selection using a graphical user interface of the mobile device, passage of a time interval of a specified number of hours, or the device memory becoming full, etc.) has occurred. Another object of the invention is to enable the user to define the trigger events.

Another object of the present invention is to enable the user to configure folders (for example, associate pre-selected recipients with a folder) and other settings using a computer having a convenient user interface that has, for example, a larger keyboard compared with the tiny keypad of the mobile device, and also a larger monitor compared with the tiny LCD display area of the mobile device. Examples of a computer having a convenient user interface are, without limitation, a desktop computer, a laptop computer, a tablet computer, etc.

An embodiment of the invention discloses a computer-implemented method of distributing files stored in folders in an Internet-enabled mobile device to one or more file recipients. The disclosed method comprises the steps of replicating and mapping a folder structure of the mobile device and the folder structure of a remote server, transferring files between a folder on the mobile device and a corresponding folder on the remote server using an Internet connection and seamlessly distributing the files on the remote server to one or more file recipients.

Another embodiment of the invention discloses the step of associating pre-selected email addresses with each folder, so that the files are automatically distributed to the pre-selected email addresses.

A preferred embodiment shows how the user can create, manage, and configure folders and other settings using a computer having a convenient interface.

Another preferred embodiment shows how the user can transfer files in multiple folders on the mobile device to the pre-selected email addresses automatically with a single-step menu selection using a graphical user interface of the mobile device or after a trigger event that may be user-defined.

In another embodiment, the distribution of files is done by sending an email message to the recipients, inviting the recipients to download the files by clicking a download link in the email message. In yet another embodiment, the distribution of files is done by automatically sending the files as attachments to an email message.

In yet another embodiment, email addresses of the potential file recipients are extracted from a Contact Data Organizer software and transferred to a remote server.

In another embodiment, a folder structure on a computer is mapped to corresponding folder structures on the mobile device and the remote server and files are transferred between the mobile device and the computer using an electromagnetic signal (for example, without limitation, infrared signal or, radio frequency signal or, Bluetooth etc.), and between the computer and the remote server using an Internet connection.

The file distributed can be any type of file, including without limitation, an image file, a video file, an audio file, or a text file. The file can be created by a user, downloaded from an external source, or captured using a file capturing device, for example, without limitation, a digital camera associated with the mobile device, a voice recorder associated with the mobile device, or a video recorder associated with the mobile device.

Various embodiments of the invention include a system comprising an Internet-enabled mobile device, a remote server linkable to the mobile device by an Internet connection, and a database. Other embodiments include a computer linked to the remote server. The mobile device may include one or more of a digital camera, a voice recorder, or a video recorder for capturing different types of files.

BRIEF DESCRIPTION OF THE DRAWINGS

Preferred embodiments are illustrated by way of example, and not by way of limitation, in the accompanying drawings and in which like reference numerals refer to similar elements and in which:

FIGS. 14a, 14b, and 14c illustrate the process of folder structure mapping and replication, as it appears on the GUI of the mobile device, according to an embodiment of the present invention.

Unless otherwise indicated, illustrations in the figures are not necessarily drawn to scale.

DETAILED DESCRIPTION OF PREFERRED EMBODIMENTS

In the following description of various embodiments including the preferred embodiments, reference is made to the accompanying drawings, which show by way of illustration some of the embodiments in which the invention may be practiced. It is to be understood that other embodiments may be utilized and structural and functional modifications may be made without departing from the spirit or scope of the invention. Those skilled in the art will readily appreciate that the detailed description given herein with respect to these drawings is for explanatory purposes as the invention extends beyond these limited embodiments.

Figure 1:
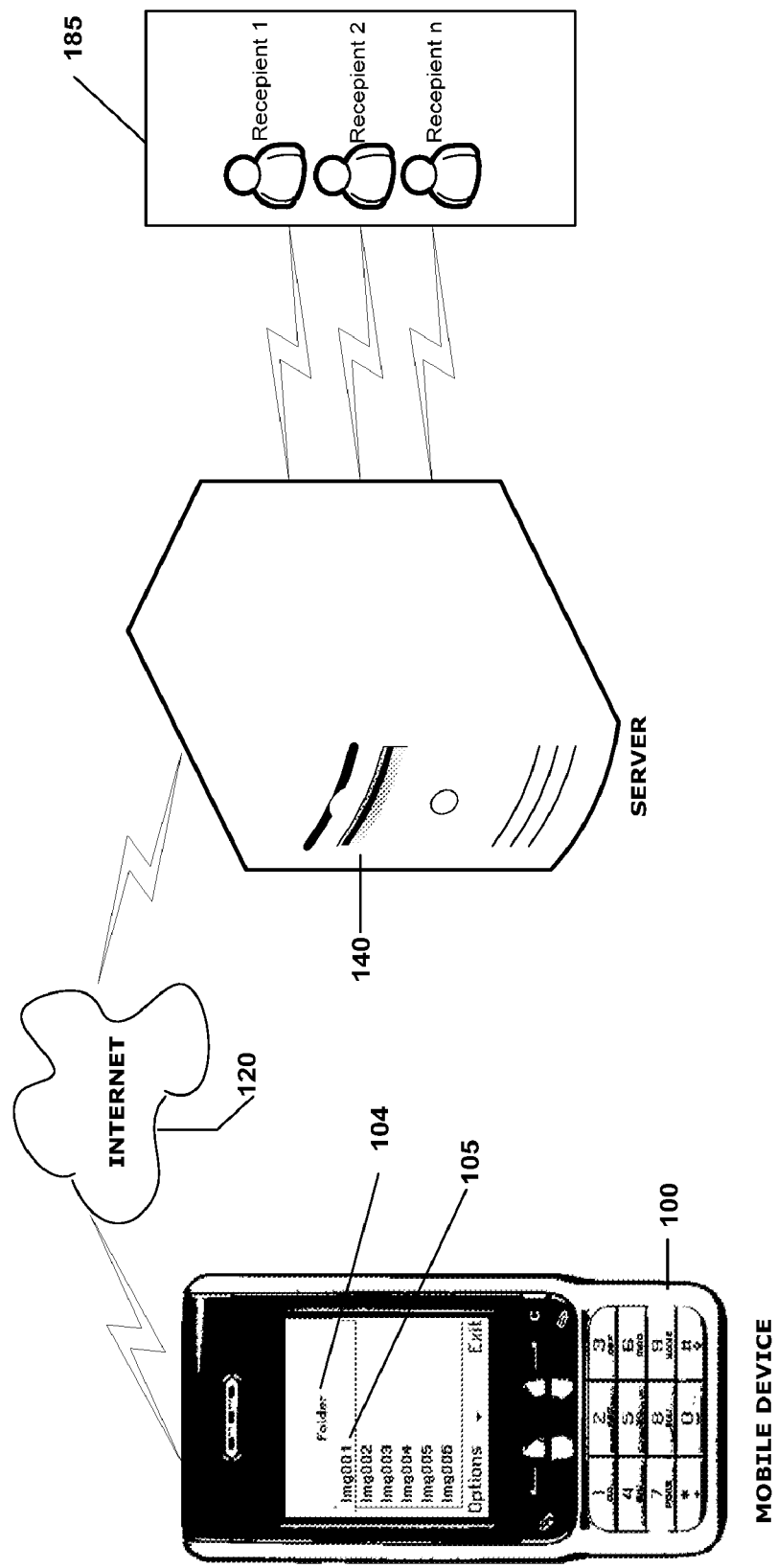
FIG. 1 provides an overview of an embodiment of the present invention.

FIG. 1 shows an overview of an embodiment of the invention as disclosed herein. The embodiment discloses an Internet-enabled mobile device 100, which has a file 105, stored within a folder 104 on the mobile device 100. The mobile device 100 may store multiple files in multiple folders depending upon the storage capacity of the device and the requirements of a user. The file 105 in the folder 104 is transferred using an Internet link 120, to a remote server 140. The remote server seamlessly distributes the file to one or more recipients 185.

The file 105 shown in FIG. 1 is any file either created by the user, or downloaded from an external source, or captured using a file capturing device associated with the mobile device 100 (for example, but not limited to, a video file, an audio file, or a text file, etc.). The mobile device 100, shown in FIG. 1 is any portable or handheld device, which is Internet-enabled (for example, but not limited to, an Internet-enabled PDA (personal digital assistant) or, an Internet-enabled cellular phone, etc.) and may optionally have one or, more file capturing devices associated with the mobile device 100 (for example, but not limited to, a digital camera, a voice recorder, or a video recorder).

The mobile device 100 is linkable to the remote server 140 by a wireless data communication link such as an Internet 120 to enable data transfer. The remote server 140 seamlessly distributes the file 105 to one or more recipients using the Internet 120.

Figure 2:
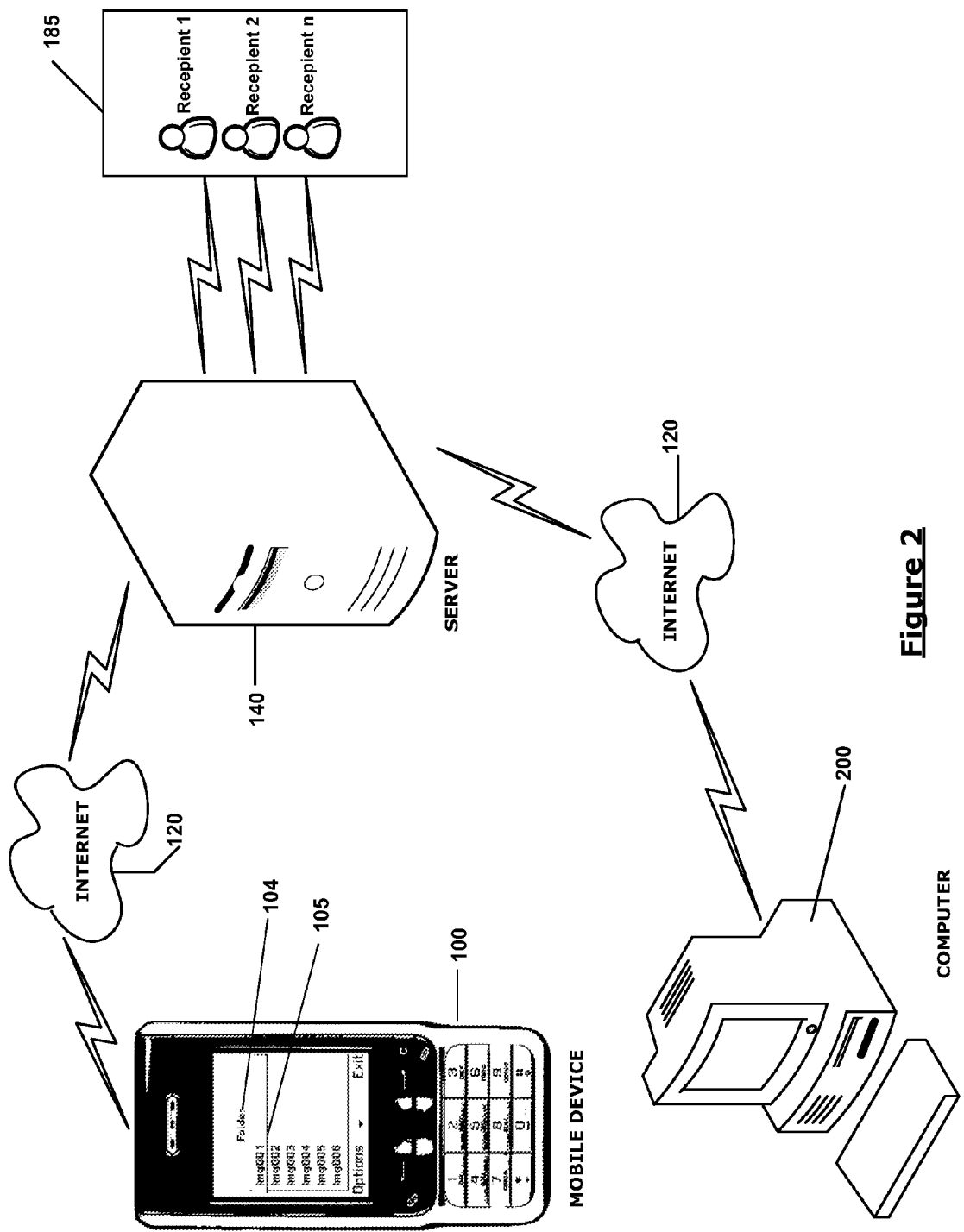
FIG. 2 provides an overview of another embodiment of the present invention.

FIG. 2 shows an overview of another embodiment. FIG. 2 shows, besides the Internet-enabled mobile device 100 and the remote server 140, a Personal Computer (PC) 200, which includes a Web browser (not shown). The Web browser communicates with the remote server 140 using the Internet connection 120. The user can configure folders and other settings on the remote server 140 by accessing a convenient Web user interface or GUI on the PC 200. The GUI accessible through the PC 200 is significantly more convenient to use as compared with the user interface (UI) of the mobile device 100, which has a very small form factor and therefore is cumbersome to operate.

Figure 3:
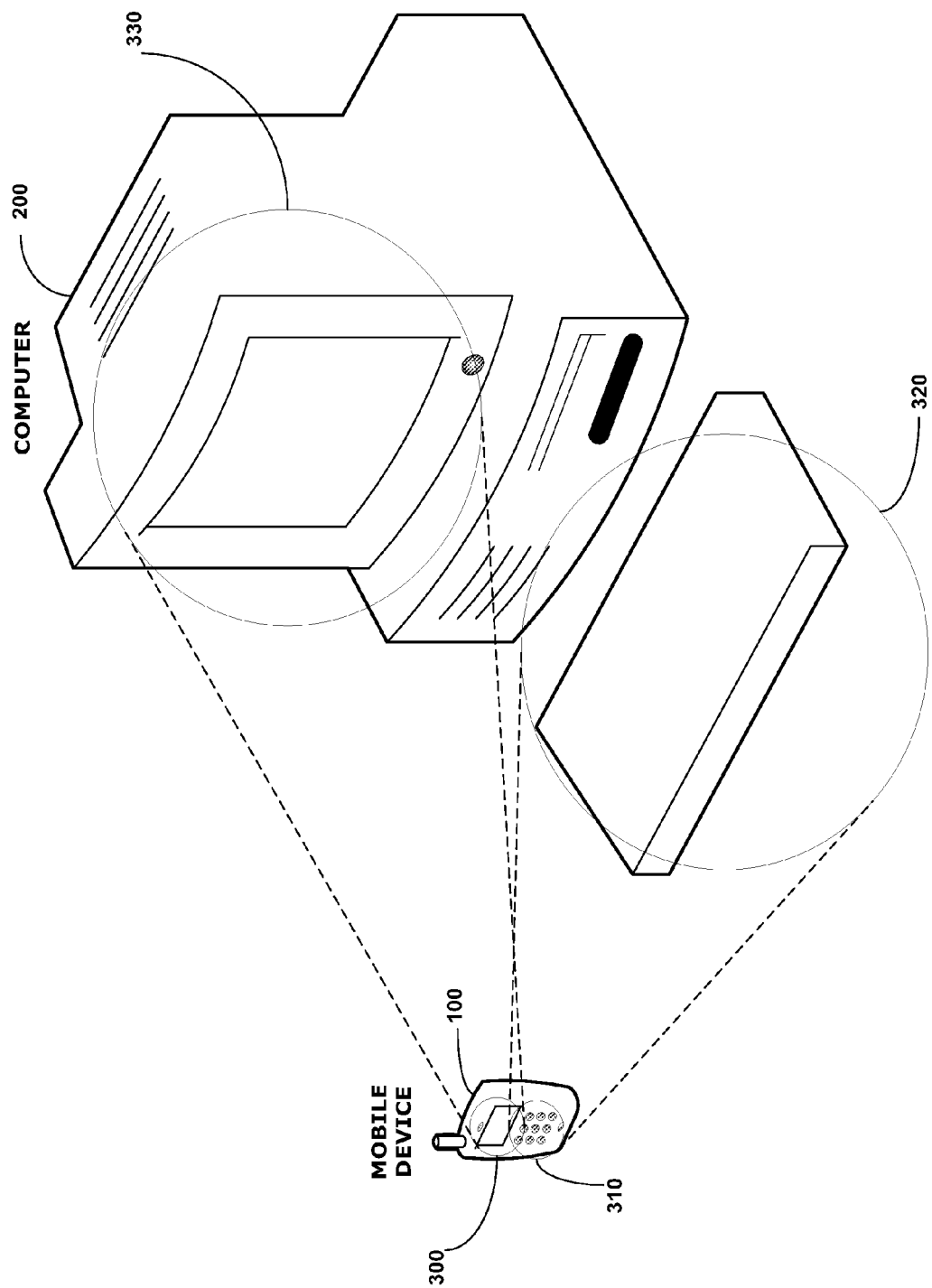
FIG. 3 shows a comparison of the user interface form factor of a mobile device with that of a personal computer used in one embodiment of the present invention, illustrating the magnification in the user interface form factor.

FIG. 3 illustrates the extent of magnification of the UI form factor that the user benefits from in the embodiment illustrated in FIG. 2. In this embodiment, the folder configuration and other settings can be configured from a Web user interface (not shown) on the PC 200. This GUI accessible from the PC 200 is much larger than the GUI on the mobile device 100. Consequently, the user deals with a much larger UI for simplified, convenient and quicker operation. FIG. 3 shows the display 300 of the mobile device 100, magnified to the display 330 of the PC 200, and the keypad 310 of the mobile device 100, magnified to the keyboard 320 of the PC 200.

Figure 4:
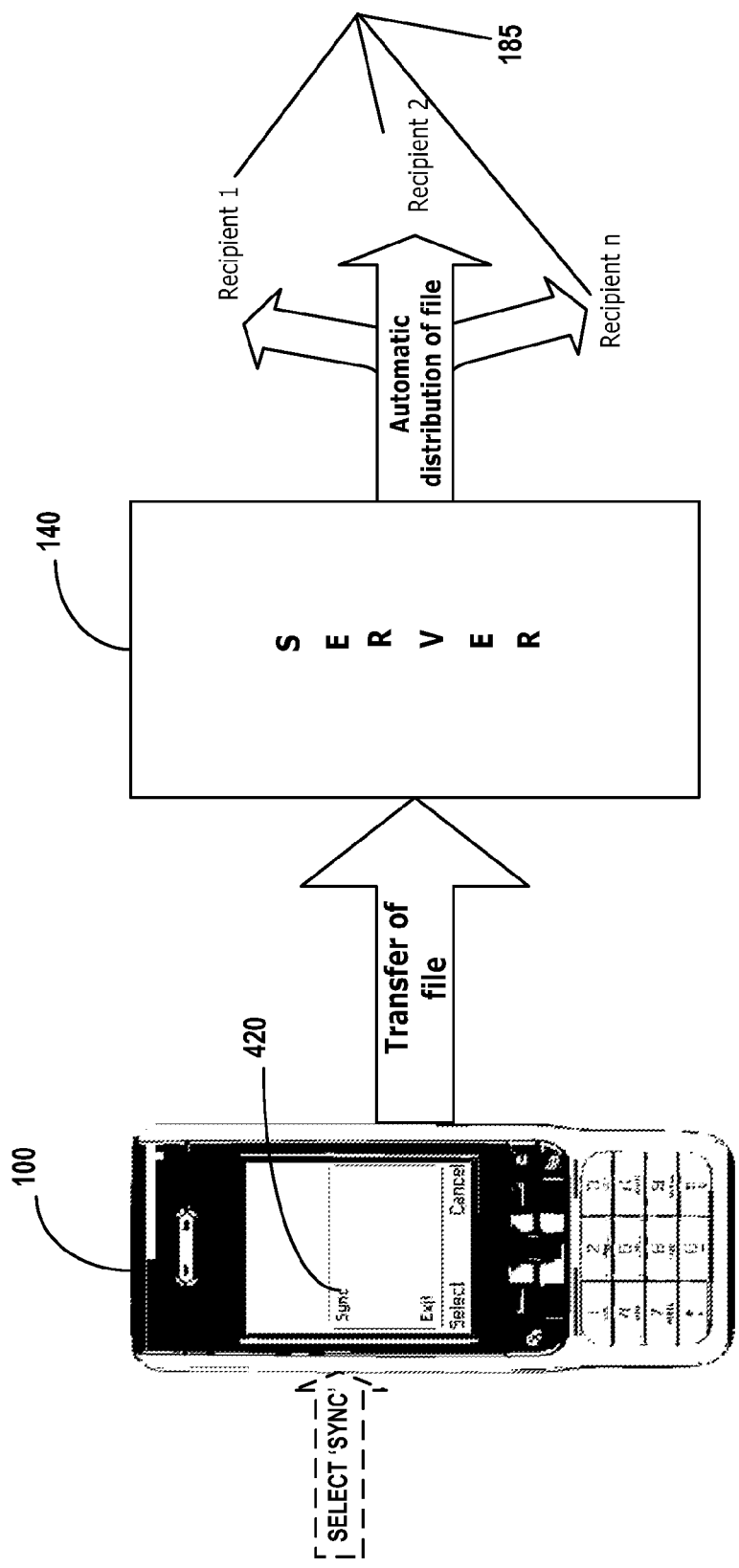
FIG. 4 illustrates the file distribution process according to an embodiment of the present invention.

FIG. 4 illustrates the process of automatic file distribution in an embodiment. The distribution is achieved with a single-step menu selection using a GUI of the mobile device 100 or, after a user-defined trigger event (for example, without limitation, a time interval of specific hours or, the device memory being full, etc.) has occurred. The single-step menu selection is achieved by selecting the 'Sync' menu option 420 on the GUI of the mobile device 100. When the user selects the 'Sync' menu option 420, the file 105 in the mobile device 100 (stored in the folder 104 therein) (shown in FIG. 1) is transferred to the remote server 140 (to a corresponding folder therein) from where it is automatically distributed to the recipients 185. If there are multiple files and folders, all the files in the folders are transferred to the remote server 140.

Figure 5:
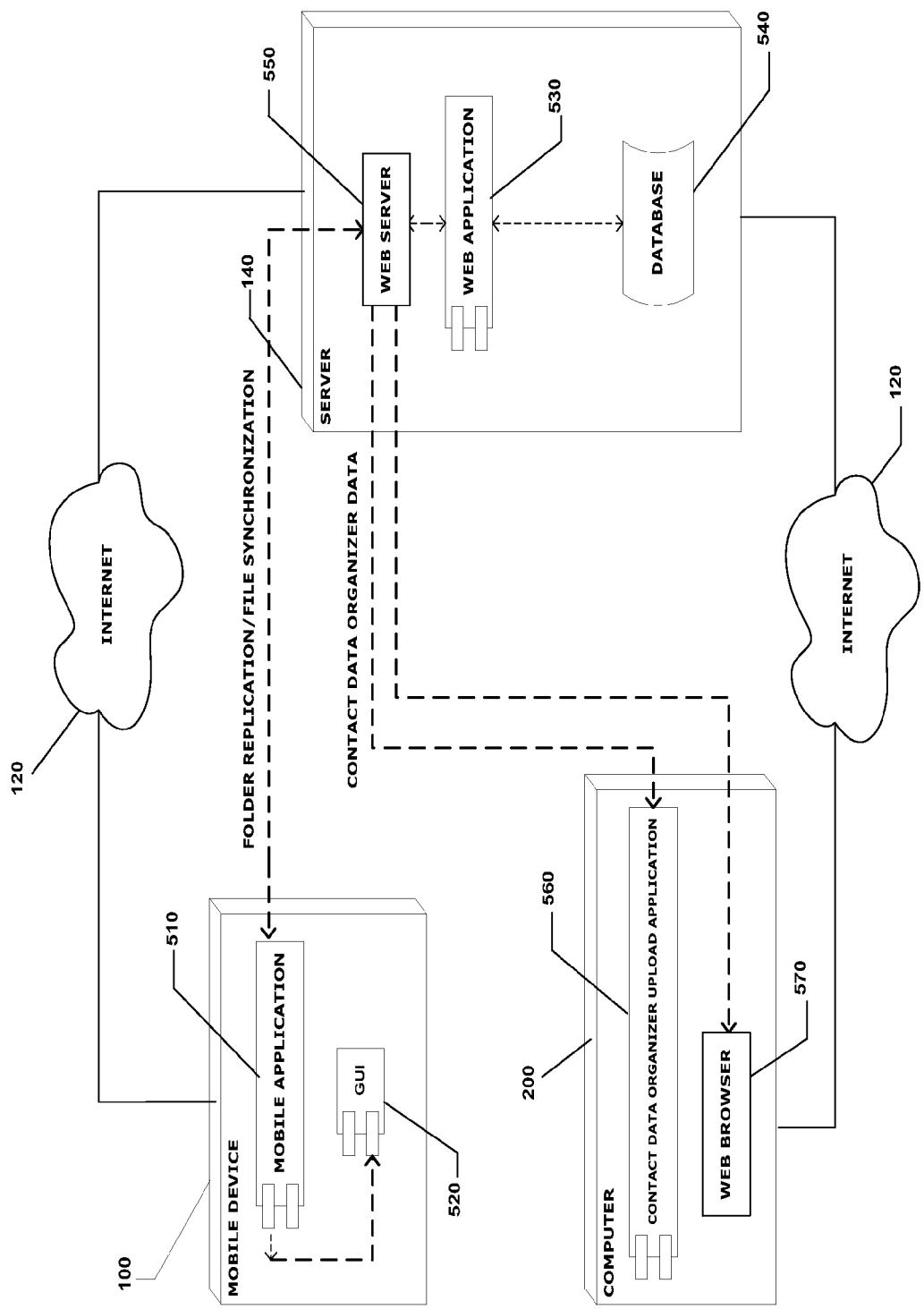
FIG. 5 is a deployment diagram showing the major components of a system, illustrating the implementation of an embodiment of the present invention.

FIG. 5 is a deployment diagram of an embodiment of the invention. The Internet-enabled mobile device 100 includes a Mobile Application component 510 and a GUI component 520. The Mobile Application component 510 has at least the functionality for replication and mapping of a folder structure on the mobile device 100 and a folder structure on the remote server 140, file transfer between a folder on the mobile device 100 and a corresponding folder on the remote server 140. The Mobile Application component 510 may optionally have the functionality to enable capturing of files using one or more file capturing devices associated with the mobile device 100 (for example, but not limited to, a digital camera, a voice recorder, or a video recorder). To achieve the functionalities described above, the Mobile Application component 510 may include a module for encrypting files, a module for checking memory to store the files, a module for interacting with a Mobile User Data File that resides in the device memory, a module for handling files/folders, and a module for initiating synchronization for file transfer between the mobile device 100 and the remote server 140.

The Mobile Application component 510 interacts with the GUI component 520, which serves as an interface between the Mobile Application component 510 and the device user (not shown). The GUI component 520 presents the interface that the user can access on the mobile device screen to capture files, transfer files, and display files and folder structure.

The Remote server 140 includes a Web Application component 530. The Remote server 140 also includes a Database 540 and a Web server software 550 (for example, but not limited to Microsoft Internet Information Server™) that the Web Application component 530 interacts with to perform specific functions. The Web Application component 530 may have the functionality for configuring folders, the functionality for synchronizing Mobile User Data File and Server User Data File, the functionality for receiving files from the mobile device 100, and the functionality for distributing files to the recipients 185 (shown in FIG. 1). To achieve the functionalities described above, the Web Application component 530 may include a module for encrypting files, a module for handling files/folders, a module for interacting with Database 540 and Server User Data File, a module for managing email addresses of contacts (file recipients) from user's Contact Data Organizer software, a module for data processing, and a module for distributing files to one or more recipients.

The Web server software 550 serves as the interface between the Mobile Application component 510 and the Web Application component 530. When the Mobile Application component 510 makes a request for file transferring and folder replication/mapping to the Web server software 550, the mobile device 100 establishes a connection with the Web server software 550. The Web server software 550 conveys the request to the Web Application component 530, which processes the request and queries the Database 540. The information retrieved from the Database 540 is passed to the Web Application component 530 and back to the Mobile Application component 510. The Database 540 may store user data including user identification data, user registration data, user subscription data, folder creation data, folder replication and mapping data, folder configuration data, file transfer related data, file related data, and contact organizer related data or, recipient related data. The nature of data residing in the Database 540 is not restricted to that mentioned above and may vary with different embodiments.

The Personal Computer 200 includes a Contact Data Organizer Upload Application component 560. The functionality of this Application is extracting email addresses of the potential file recipients from the Contact Data Organizer software (for example, but not limited to Microsoft Outlook™) residing on the PC 200 (not shown) and transferring the email addresses to the Database 540 in the remote server 140. The Web Browser 570 in the Personal Computer 200 serves as the Web interface for the Web Application component 530 in the remote server 140. The user creates, manages and configures folders and other settings on the remote server 140 using the Web user interface (not shown).

Figure 6:
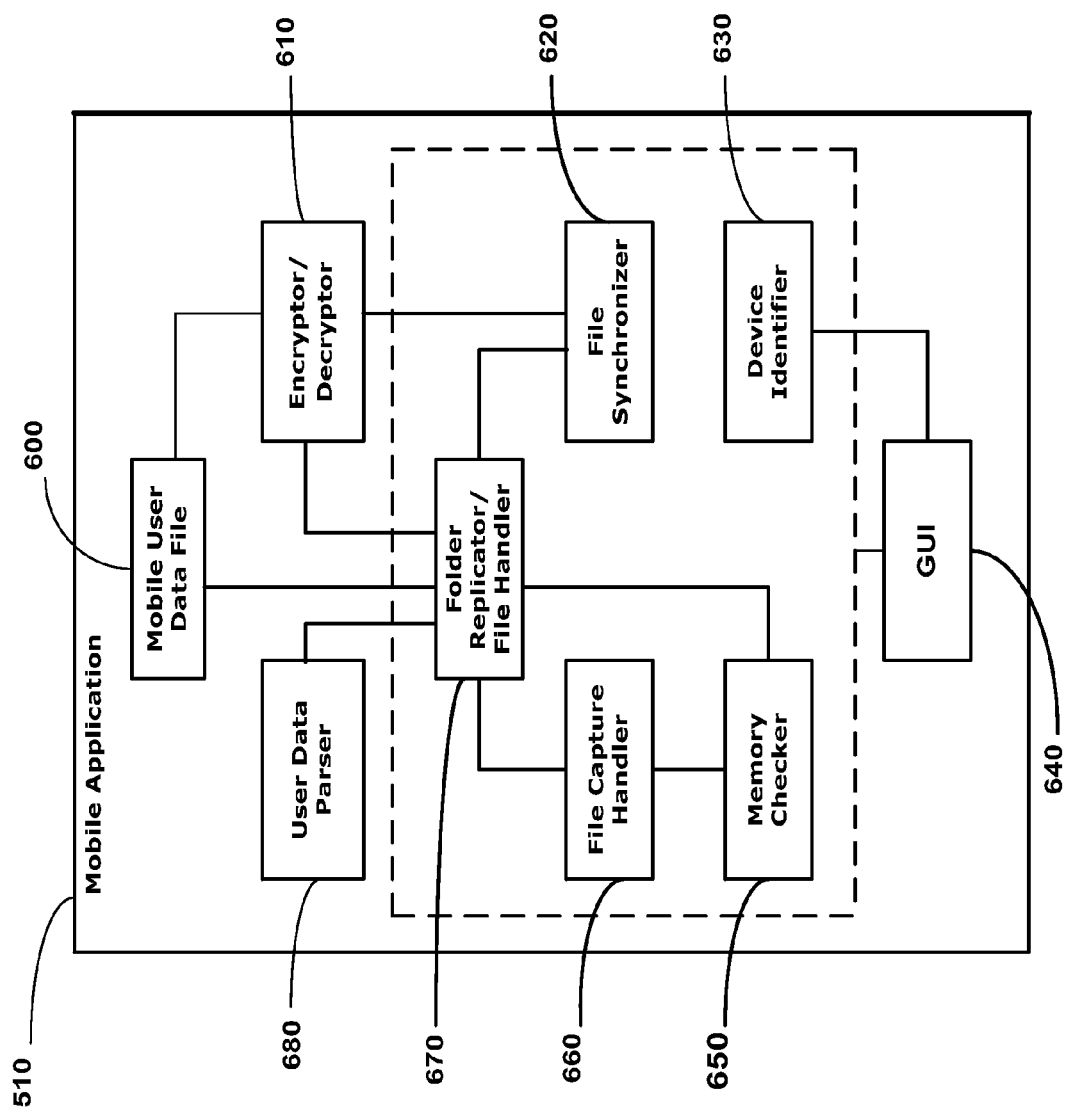
FIG. 6 is a module diagram of a Mobile Application component set up in a mobile device, illustrating the interactions of different modules of Mobile Application component, according to an embodiment of the present invention.

FIG. 6 is a Module diagram of the Mobile Application component 510 included in the Internet-enabled mobile device 100 according to an embodiment. The Mobile Application component 510 comprises a plurality of modules each of which performs a specific functionality. The Mobile Application component 510 is preferably included in the memory of the mobile device 100. The Mobile Application component 510 interacts with the Mobile User Data File 600 that preferably also resides in the memory of the mobile device 100. The Mobile User Data File 600 according to this embodiment is an XML data file that may store data on folder structure, file paths, and file settings of users. An XML data file has major advantages in comparison to the conventional RDBMS (relational database management system) database—it is dynamic, flexible and easy to upgrade. The data in this XML data file is downloaded from the Database 540 the first time the Mobile Application component 510 is set up in the mobile device 100. The Mobile Application component 510 refers to the Mobile User Data File 600 for folder replication/mapping, and file transferring to the remote server 140.

The User Data Parser 680, is a module in the Mobile Application component 510 that can read data from and write data into the Mobile User Data File 600. The data that this module reads from the Mobile User Data File 600 may include the folder structure to be replicated and mapped in the mobile device 100, the path of the files in the folders, and file settings set by the user. The data that this module writes into the Mobile User Data File 600 may include the path of the files in the folders. The data about the folder structure to be replicated in the mobile device 100 is passed on to the Folder Replicator/File Handler module 670.

The Folder Replicator/File Handler module 670 reads data related to folder replication and mapping stored in the Mobile User Data File 600 using the User Data Parser module 680. Based on this data related to folder replication and mapping, the Folder Replicator/File Handler module 670 creates the same folder structure in the mobile device 100 as that existing in the remote server 140. It also maps the folders in the mobile device 100 to corresponding folders in the remote server 140.

The GUI module 640 of the Mobile Application component 510 provides the interface between the mobile device user (not shown) and the rest of the Mobile Application component 510 and the Mobile User Data File 600. The GUI module 640 interacts with the File Capture Handler module 660 to enable the device user to capture files. The GUI module 640 interacts with the Folder Replicator/File Handler module 670 to enable the device user to view the folder structure and the files saved therein. The GUI module 640 interacts with the File Synchronizer module 620 to enable the device user to be notified about the progress of the process of synchronization. The GUI module 640 also interacts with the Device Identifier module 630 to inform the device user if his/her device is a valid user. In the case, the mobile device 100 is not a valid user, the user is disallowed from proceeding further.

The File Capture Handler 660 enables the user to capture files using one or more file capturing devices associated with the mobile device 100 (for example, but not limited to, a digital camera, a voice recorder, or a video recorder). The Memory Checker module 650 checks if there is adequate memory to store the captured files in. If there is enough memory to store the files, the Folder Replicator/File Handler module 670 saves the files in the replicated folders and updates the Mobile User Data File 600 with data related to the new file path.

The File synchronizer 620 encrypts the data in the updated Mobile User Data File 600 with the help of the Encryptor/Decryptor module 610 and creates a temporary user data file. It also encrypts the new files saved in the folders. The File synchronizer 620 sends the encrypted files to the remote server 140. The File synchronizer 620 also receives an encrypted user data file from the remote server 140—the Server User Data File (not shown). The Server User Data File according to embodiments disclosed herein is an XML data file that may store data on folder structure, folder configuration and file settings of users. The data in this file is obtained from the Database 540, which is the data entered by the user from the Web browser 570 in the PC 200 (shown in FIG. 5). The File synchronizer 620 decrypts the Server User Data File and updates the Mobile User Data File 600 with the data it received from the Server User Data File.

Figure 7:
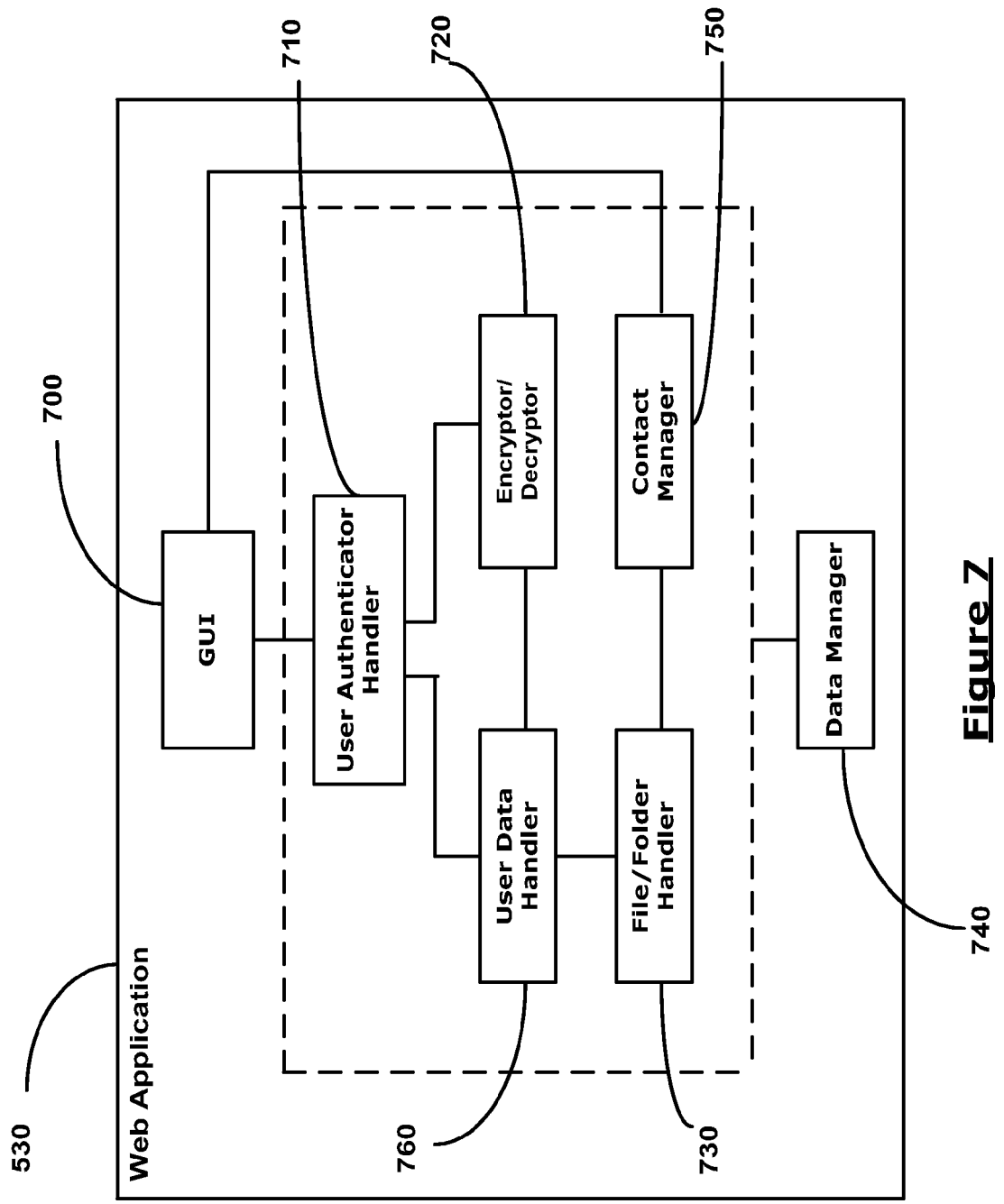
FIG. 7 is a module diagram of a Web Application component set up in a remote server, illustrating the interactions of different modules of the Web Application component, according to an embodiment of the present invention.

FIG. 7 is a Module diagram of the Web Application component 530 residing in the remote server 140 according to an embodiment. The Web Application component 530 serves as an interface between the user (not shown) and the Database 540 (shown in FIG. 5) in the remote server 140. The Web Application component 530 comprises a plurality of modules each of which performs a specific functionality. The Web Application component 530 is preferably set up in the Web remote server 550 of the remote server 140. The Web Application component 530 interacts with the Database 540 that also preferably resides in the Web remote server 550 of the remote server 140. The Database 540 generates a Server User Data File (not shown), which is an XML data file that is created when the user registers through the Web browser 570 on the PC 200 (shown in FIG. 5). This XML data file according to this embodiment stores at least data on folder replication and mapping. The Web Application component 530 reads the Server User Data File for information on at least folder replication/mapping and folder configuration.

The GUI module 700, accepts data from the user on the PC 200 (not shown). The User Authenticator Handler 710 verifies the authenticity of the user and passes on the user data comprising details of the folders created by the user, the folder configuration and the email addresses of the user's contacts to the Data Manager module 740. The Data Manager 740 processes the user data in a format, readable by the Database 540 (shown in FIG. 5) and saves it therein. The Database 540 generates a Server User Data File, which stores the data on folder replication/mapping and folder configuration information for this particular user.

The User Data Handler module 760 handles the requests coming from the Mobile Application component 510 (shown in FIG. 5) in the mobile device 100. The requests may include file transferring and synchronization of the Mobile User Data File 600 and Server User Data File. The User Data Handler 760 receives the files and the Mobile User Data File 600 from the mobile device 100. These files come encrypted from the Mobile Application component 510. Therefore, the Encryptor/Decryptor module 720 decrypts them and sends the decrypted files back to the User Data Handler 760. The User Data Handler 760 reads the data on folder mapping (i.e, data disclosing which files are stored in which folders) from the Mobile User Data File 600 and passes on this information to the File/Folder Handler module 730 and the Database 540 (shown in FIG. 5) through the Data Manager module 740. The Database 540 updates the Server User Data File with this information.

The User Data Handler 760 also compares the Mobile User Data File 600 with the Server User Data File. If there is any dissimilarity in the contents of both these data files, the User Data Handler 760 updates the User Data File that lacks some data in comparison to the other User Data File. Therefore, if the Mobile User Data File requires to be updated, the User Data Handler 760 forms a new user data file comprising of the dissimilar data and sends it back to the Mobile Application component 510. The Mobile Application component 510 reads this new user data file and updates the Mobile User Data File 600 with the data in the new user data file. If the Remote server User Data File requires to be updated, the User Data Handler 760 changes the format of the differential data to a format readable by the Database 540 (shown in FIG. 5) and then sends the differential data to the Database 540. The Database 540 updates the data in the Server User Data File based on this differential data.

The File/Folder Handler module 730 stores the files in respective server folders in accordance with the folder mapping data received from the Mobile User Data File 600. It also reads the folder configuration details from the Server User Data File and accordingly distributes the files in the folders to the email addresses of the recipients pre-associated with the folders.

The Contact Manager module 750 manages user's contact-related data obtained from the Contact Data Organizer Upload Application 560 (shown in FIG. 5). This includes addition, deletion and editing of email addresses of the user's contacts. The Contact Manager 750 sends all these changes to the Data Manager 740, which processes the data in a format, which is compatible with the Database 540 and updates the Database 540 with this data.

Figure 8:
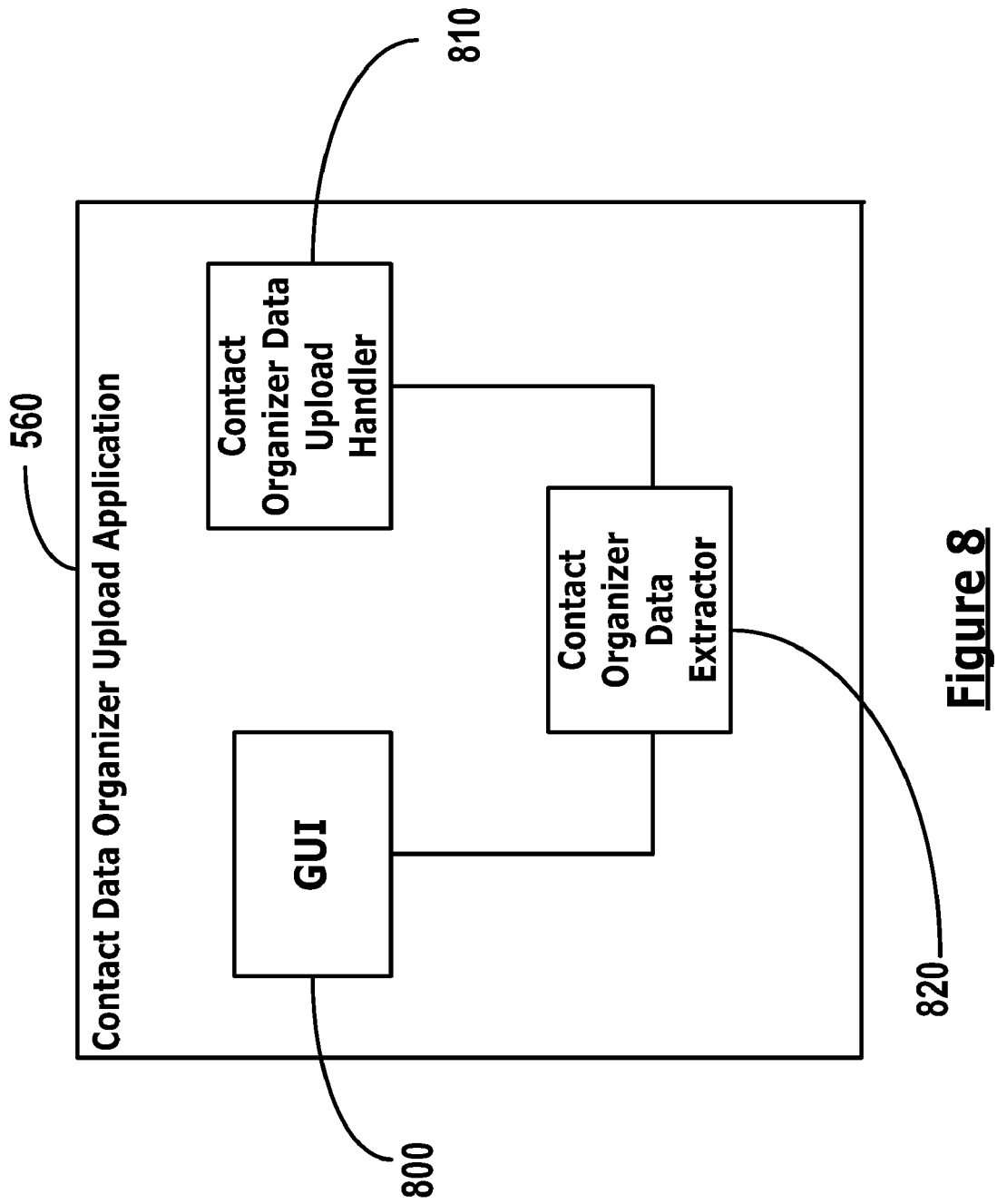
FIG. 8 is a module diagram of a Contact Data Organizer Upload Application component, set up in a computer, illustrating the interactions of different modules of the component, according to an embodiment of the present invention.

FIG. 8 is a Module diagram of the Contact Data Organizer Upload Application 560 installed in the PC 200 (shown in FIG. 5) according to an embodiment. It comprises a plurality of modules each of which helps in extracting email addresses of the potential file recipients from the Contact Data Organizer software residing on the PC 200 and transferring the email addresses to the Database 540 in the remote server 150 (shown in FIG. 5). The Contact Organizer Data Extractor 820 extracts email addresses of the potential file recipients from Contact Data Organizer on the PC 200 (not shown) when the user chooses to do so using the GUI module 800. The Contact Organizer Data Upload Handler 810 accesses the extracted email addresses and uploads them to the Database 540 in the remote server 140.

Figure 9:
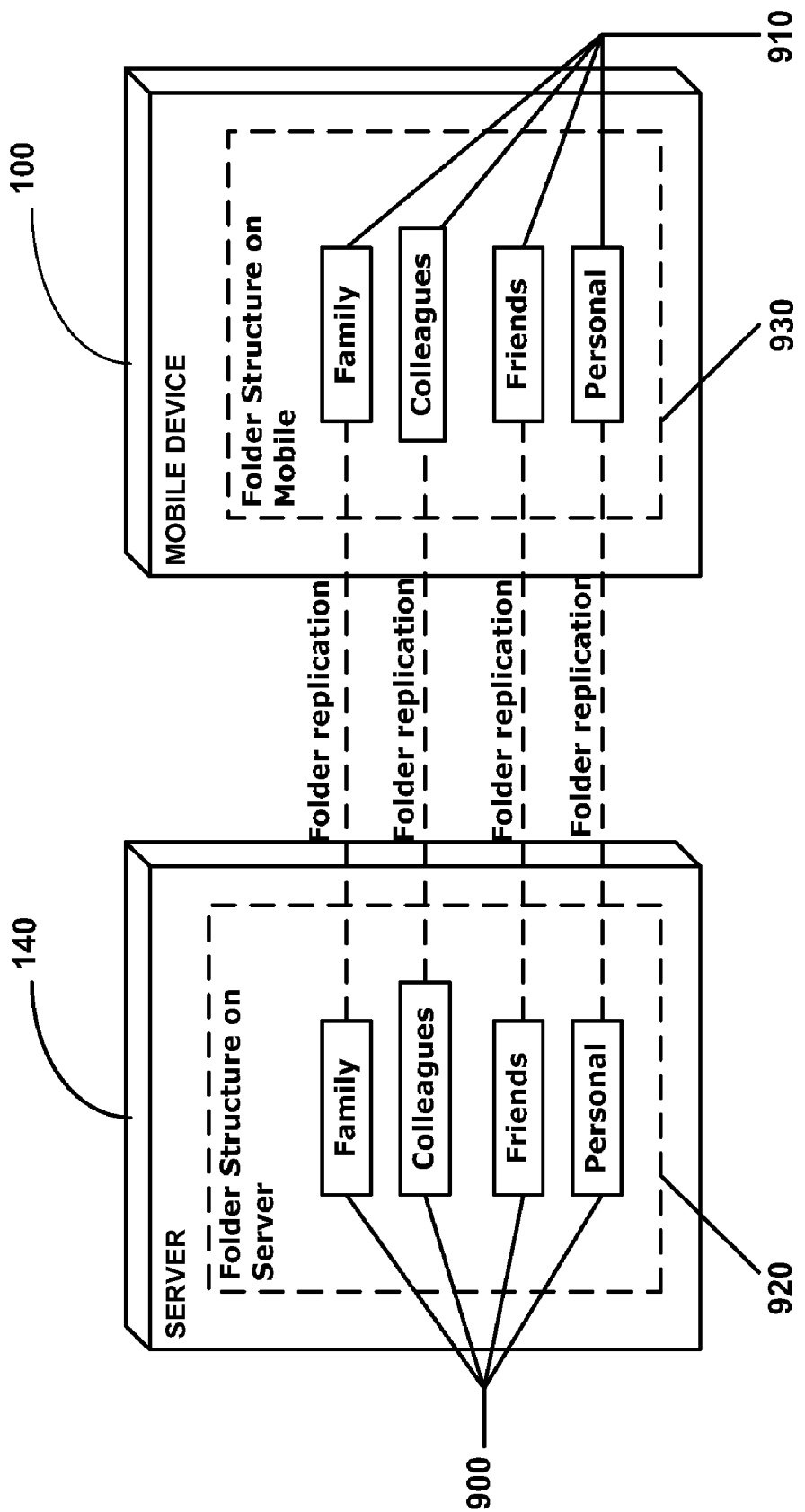
FIG. 9 illustrates the process of folder replication, according to an embodiment of the present invention.

FIG. 9 illustrates the process of Folder Replication between the remote server 140 and the mobile device 100 according to an embodiment. The illustration is by way of an example and is not limited to what is shown in FIG. 9. Folders 'Family', 'Colleagues', 'Friends' and 'Personal' 900 are created on the remote server 140 by the user using the Web user interface on the PC 200 (shown in FIG. 2). The folder hierarchy thus created on the remote server 140 forms the 'Folder Structure on Remote server' 920. When the user selects the 'synchronize' menu option (shown in FIG. 4) using the GUI of the mobile device 100, the folder structure on remote server 900, is replicated on to the mobile device 100. Alternatively, when a trigger event occurs, the folder structure on remote server 900, is replicated on to the mobile device 100. Therefore, the folders 910 are replicated copies of the folders 900. The folder structure thus replicated on the mobile device 100 makes up the 'Folder Structure on Mobile' 930.

If the user makes any changes to the 'Folder Structure on server' 920, the changes are also replicated to the 'Folder Structure on Mobile' 930 after the user selects the 'synchronize' menu option (shown in FIG. 4) using the GUI of the Mobile Device 100 (shown in FIG. 4). Alternatively, the changes are replicated to the 'Folder Structure on Mobile' 930 after a trigger event occurs. Therefore, if the user renames a folder or, deletes a folder on the remote server 140, the folder structure on the mobile device 100 also reflects the same changes. All the data related to folder replication is stored in the Server User Data File (not shown). When the user selects the 'synchronize' menu on the mobile GUI, or, when a trigger event occurs, the data in the Server User Data File is transferred to the Mobile User Data File 600 (shown in FIG. 6). The Mobile Application component 510 (shown in FIG. 5) in the mobile device 100 reads this data and accordingly creates an exact copy of the 'Folder Structure on server' 920, on the mobile device 100.

Figure 10:
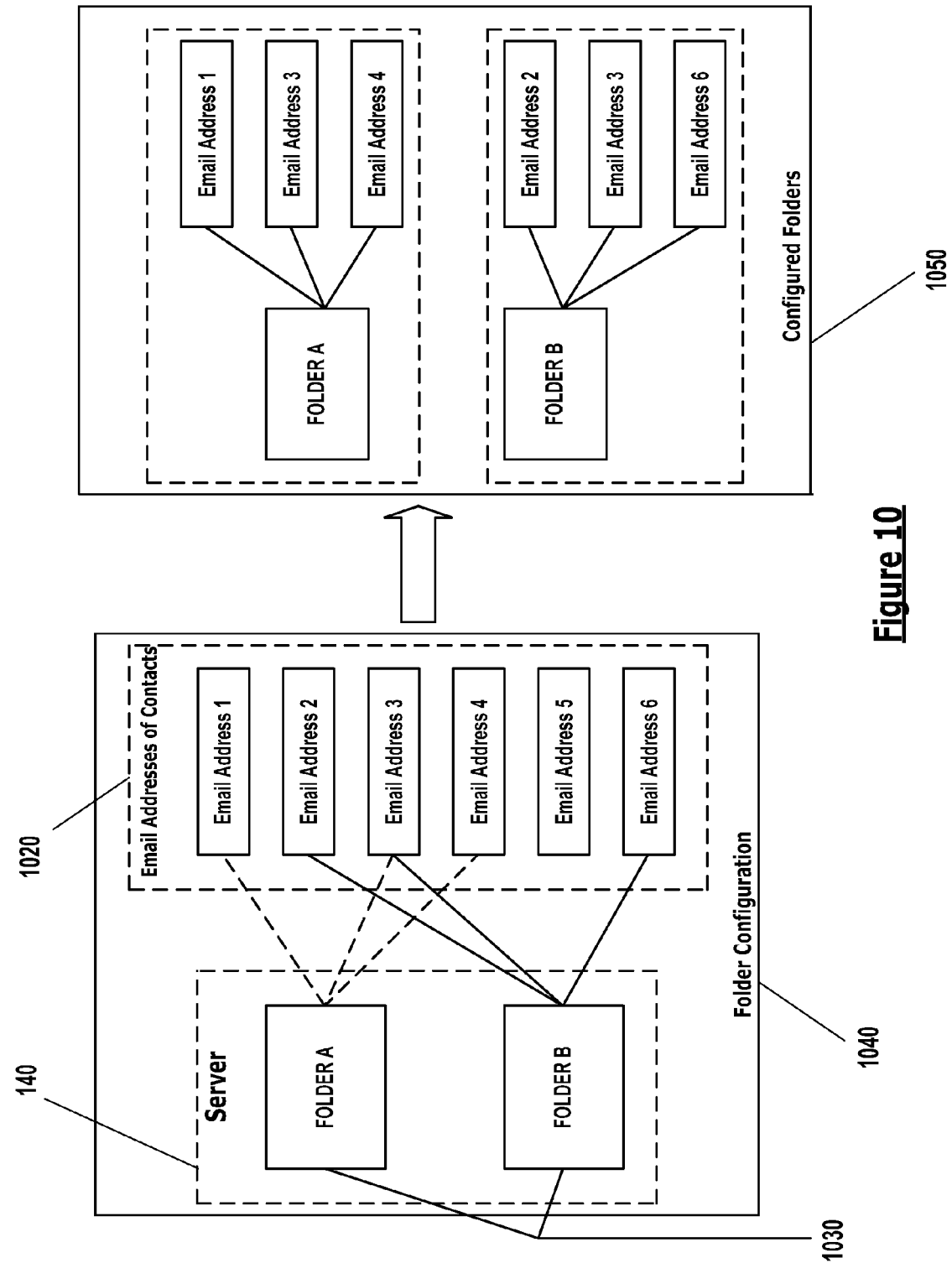
FIG. 10 illustrates the process of folder configuration, according to an embodiment of the present invention.

FIG. 10 illustrates the process of Folder Configuration as it is configured in an embodiment of the invention shown in FIG. 5. The illustration is by way of an example and is not limited to what is shown in FIG. 10. The user configures the folders using the Web Browser 570 on the PC 200 (shown in FIG. 5). Since the GUI on the PC 200 is the Web interface of the remote server 140, whatever configuration is done on the PC 200 reflects directly on the remote server 140.

Folders A, B 1030, are folders where files for distribution are to be stored. They constitute the folders created on remote server 140, by the user using the Web Browser 570 on the PC 200 (shown in FIG. 5). Email addresses 1, 2, 3, 4, 5, and 6 are email addresses of six contacts from the user's Contact Data Organizer (shown in FIG. 5). The user assigns Email addresses 1, 3, and 4 to Folder A, and assigns Email addresses 2, 3, and 6 to Folder B. The enclosure 1040 represents folder configuration and the enclosure 1050 represents the configured folders. In the enclosure 1050, Folder A is configured to be associated with email addresses 1, 3, and 4, while Folder B is configured to be associated with email addresses 2, 3, and 6. The information related to the folder configuration for a user, is stored in the Server User Data File for the user in the remote server 140 (not shown). The Web Application component 530 in the remote server 140 (shown in FIG. 5) reads this information and automatically distributes the files saved in Folder A to the email addresses 1, 3, and 4 and the files saved in Folder B to the email addresses 2, 3, and 6.

Figure 11:
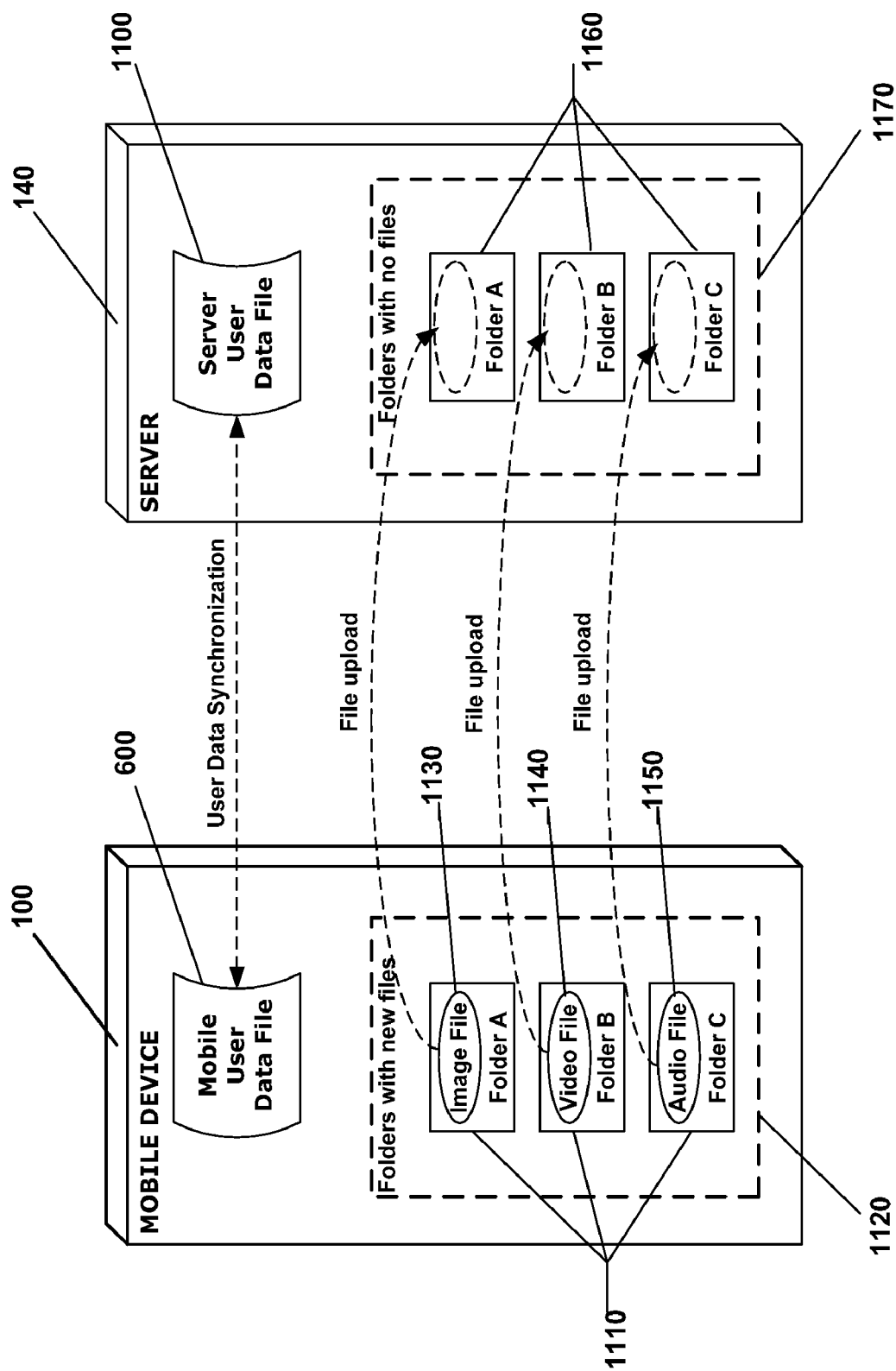
FIG. 11 illustrates the process of file synchronization, according to an embodiment of the present invention.

FIG. 11 illustrates the process of File Synchronization as it happens in an embodiment of the invention. The illustration is by way of an example and is not limited to what is shown in FIG. 11. File synchronization is the process of synchronizing the Server User Data File 1100 and the Mobile User Data File 600, and the process of transferring files preferably between the mobile device 100 and the remote server 140. The process of 'synchronization' occurs when the user selects the 'synchronize' menu option (shown in FIG. 4) using the GUI of the Mobile Device 100 or, when a trigger event (for example, without limitation, passage of a time interval of specific hours or, the device memory becoming full, etc.) occurs.

For the purpose of illustration, with reference to the FIG. 11 let us suppose that the user has created Folders 'A', 'B', 'C' 1160, on the remote server 140, which have been replicated to the mobile device 100. Therefore, there are Folders 'A', 'B', and 'C' 1110, on the mobile device 100. Let us also suppose Folder 'A' has an image file 1130, saved in it, Folder 'B' has a video file 1140, saved in it, and Folder 'C' has an audio file 1150, saved in it.

In the embodiment illustrated by FIG. 11, the files 1130, 1140, and 1150 are transferred to the corresponding folders in the remote server 140. Therefore, the image file 1130, is transferred to the corresponding Folder 'A', the video file 1140, is transferred to corresponding folder 'B', and the audio file 1150, is transferred to the corresponding folder 'C'.

According to the embodiment illustrated by FIG. 11, the Mobile User Data File 600, is transferred to the Web Application component 530 (in an embodiment of the invention shown in FIG. 5) in the remote server 140. The Web Application component 530, reads the data in the Mobile User Data File 600 and compares it with the data in the Server User Data File 1100. If there is discrepancy in data between the two data files, and if the Mobile User Data File 600 requires to be updated with the data present in the Server User Data File 1100, the Web Application component 530 generates a new user data file that stores only the differential data and sends the new user data file to the Mobile Application component 510. The Mobile Application component 510, updates the data in the Mobile User Data File 600 based on the data in the new user data file. If the Server User Data File 1100 requires to be updated with the data in the Mobile User Data File 600, the Web Application component 530 changes the format of the differential data to a format readable by the Database 540 and sends the differential data to the Database 540. The Database 540 updates the data in the Server User Data File 1100 based on this differential data. In this way, user data files of both the mobile device 100 and the remote server 140 are synchronized.

Figure 12:
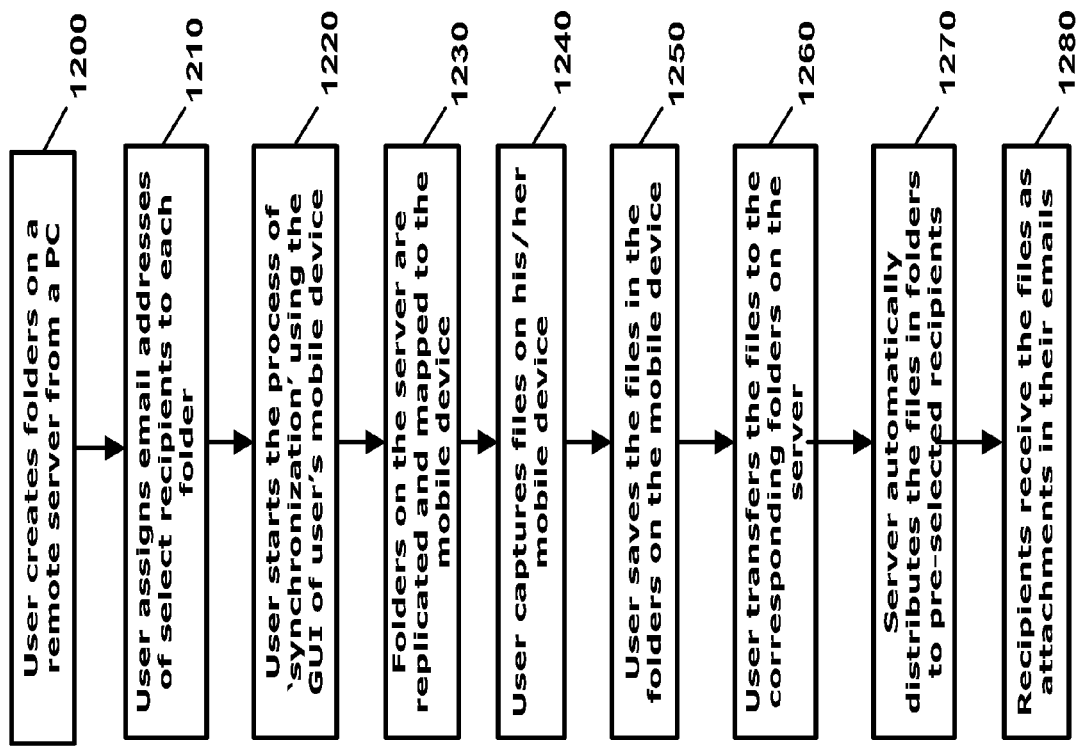
FIG. 12 is a flow diagram showing the process flow for distributing files automatically from a mobile device, according to an embodiment of the present invention.

FIG. 12 shows a flow diagram illustrating the process flow for distributing files automatically from a mobile device, according to an embodiment.

In step 1200, a user creates one or more folders on a remote server using a Web user interface or GUI on a PC.

In step 1210, the user assigns email addresses of select contacts from his/her Contact Data Organizer software, to each folder.

In step 1220, the user starts the process of synchronization using the GUI of user's mobile device for enabling folder replication and mapping between the mobile device and the remote server.

In step 1230, the folders created on the remote server are replicated and mapped to the mobile device.

In step 1240, the user captures one or more files on his/her mobile device.

In step 1250, the user saves the files in the folders that have been replicated in his/her mobile device.

In step 1260, the user transfers the files to the corresponding folders on the remote server.

In step 1270, the remote server automatically distributes the files in folders to the pre-selected email addresses of the user's contacts as per the folder configuration set by the user in step 1210.

In step 1280, the recipients receive the files as attachments in their emails. The recipients may also receive an email message inviting them to download the files by clicking a download link in the email message.

Figure 13B:
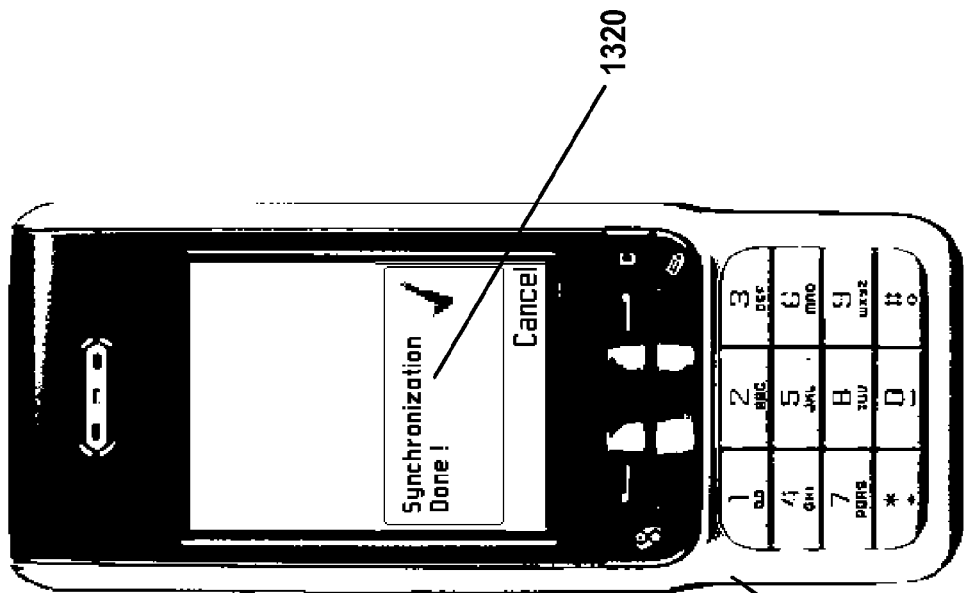
FIGS. 13a and 13b illustrate the process of synchronization as it appears on the graphical user interface (GUI) of the mobile device, according to an embodiment of the present invention.
Figure 13A:
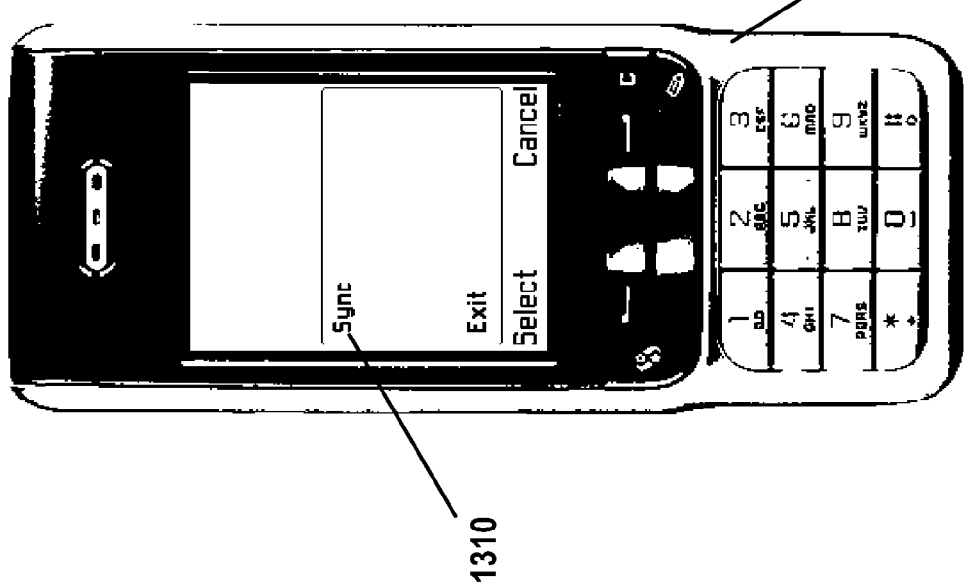

FIGS. 13a and 13b show 'synchronization' as it appears on the GUI of the mobile device 100 according to the embodiments represented by FIG. 1 and FIG. 2. The user selects the 'Sync' menu option 1310 appearing on the GUI of the mobile device 100 to start the process of synchronization. The GUI of the mobile device 100 displays the words 'Synchronization Done!' 1320 when the process of synchronization is complete.

FIGS. 14a, 14b, and 14c illustrate the folder structure as it appears on the GUI of the mobile device 100, according to an embodiment. The illustration is by way of an example and is not limited to the folder structure shown in these figures. FIG. 14a shows the folders 'Ringtone', 'Dictation', and 'Images' on the GUI of the mobile device 100. When the user selects the Folder 'Images' 1400 in FIG. 14a, the GUI of the mobile device 100 displays all the folders that exist within 'Images' as shown in the FIG. 14b. When the user selects the menu option 'open' 1410 for Folder 'Friends' 1420 in FIG. 14b, the GUI of the mobile device 100 displays all the image files that are stored in the folder 'Friends', as shown in FIG. 14c.

Figure 15:
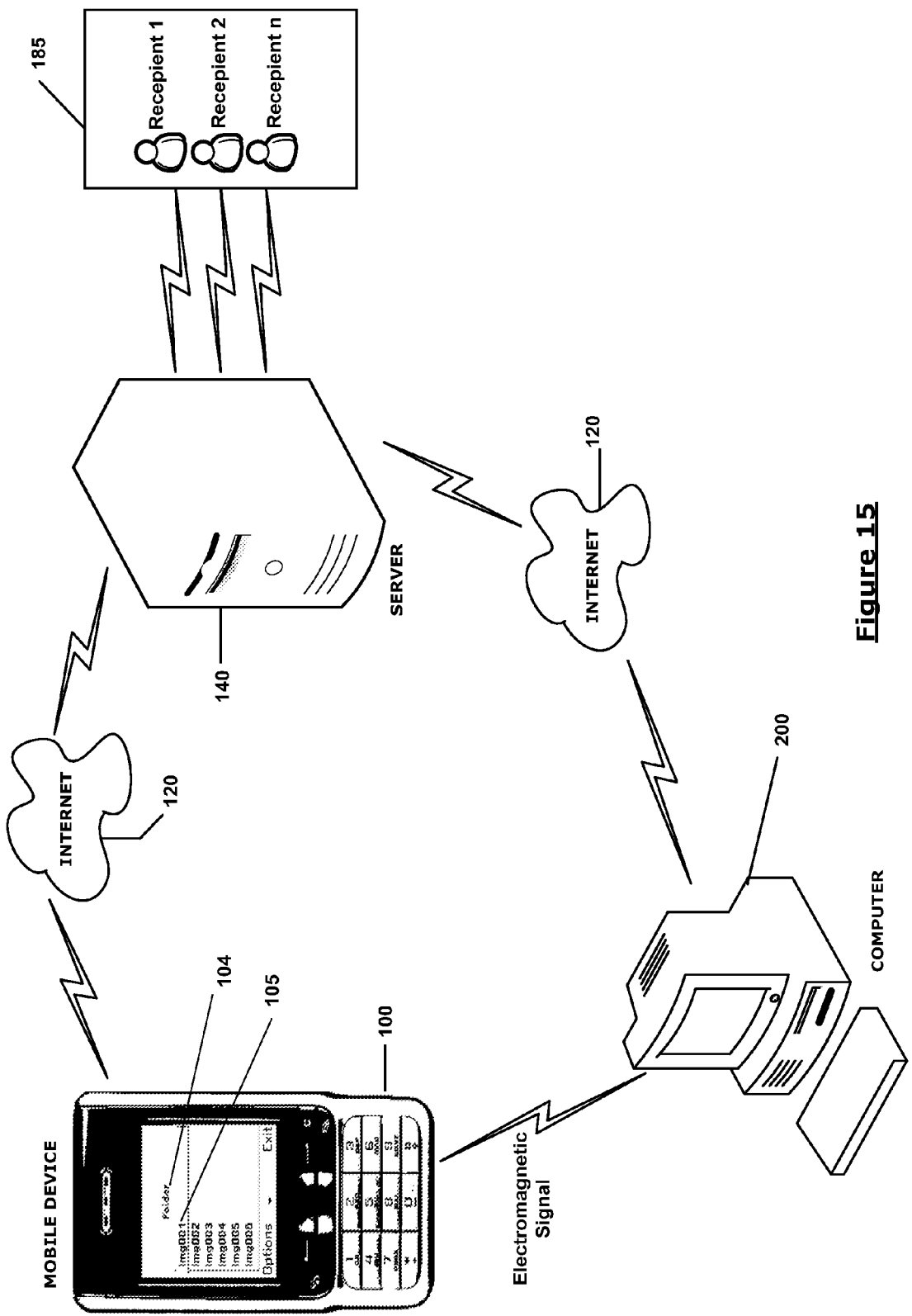
FIG. 15 provides an overview of yet another embodiment of the present invention.

FIG. 15 shows an overview of yet another embodiment, wherein, the Computer 200 is linked to the mobile device 100 by means of an electromagnetic signal (for example, without limitation, infrared signal, radio frequency signal, Bluetooth etc.), such that the folder structure on the mobile device 100, and the folder structure on the remote server 140, are replicated and mapped with a corresponding folder structure on the computer 200. In addition, the files between the folder on the mobile device 100 and a corresponding folder on the computer 200 are transferred using an electromagnetic signal (for example, without limitation, infrared signal, radio frequency signal, Bluetooth etc.). The files between the folder on the computer 200 and the corresponding folder on the remote server 140 are transferred using the Internet 120.

Having fully described the preferred embodiments, other equivalent or alternative methods of distributing files from a mobile device to pre-selected recipients according to the present invention will be apparent to those skilled in the art. The invention has been described above by way of illustration, and the specific embodiment disclosed is not intended to limit the invention to the particular forms disclosed. For example, the embodiments described in the foregoing were directed to providing you clear ideas about the preferred modes, including the best mode, of making and using the present invention; however, in alternate embodiments, those skilled in the art may implement the invention using various other means without deviating from the central idea of the invention. The invention therefore covers all modifications, equivalents, and alternatives falling within the spirit and scope of the following claims.

I claim:

1. A computer-implemented method of seamlessly distributing files stored in a plurality of folders in an Internet-enabled source mobile device to one or more recipient devices, comprising the steps of:

replicating and mapping a folder structure for files of a user on an Internet-enabled mobile source device of the user and a folder structure of the user on a remote server, said remote server being wirelessly connectable to the mobile device by an Internet connection;

transferring files between one or more folders on the mobile device and corresponding mapped folders on said remote server; requiring only one action by said user of said mobile device to initiate said transfer; and distributing the files to one or more recipient devices from said remote server, requiring no further action by users of said recipient devices, by the further steps of:

extracting one or more recipient device addresses from a contact data organizer on said mobile source device and transferring said recipient device addresses to said remote server;

associating one or more of said recipient device addresses with each of said files based on the structure of said mapped folders; and using said recipient device addresses to distribute said files to one or more recipient devices from said remote server upon the occurrence of a user-selected trigger event.

2. The method of claim 1, wherein some of the files on the mobile device are captured using a file capturing device associated with the mobile device.

3. The method of claim 1, further comprising a step of three-way replicating and mapping of folder structures on the mobile device, a computer having a convenient user interface, and said remote server, and wherein the step of transferring the files further comprises the steps of:

transferring the files between the folders on the mobile device and corresponding mapped folders on the computer using an electromagnetic signal; and transferring the files between the folders on the computer and the corresponding mapped folders on said remote server using an Internet connection.

4. The method of claim 1, wherein the transfer of the files between the folders on the mobile device and the corresponding mapped folders on said remote server takes place using the Internet connection between the mobile device and said remote server.

5. The method of claim 4, further comprising the step of configuring the association of said recipient device addresses with each of said folders using a Web site interface on said remote server.

6. The method of claim 5, wherein the trigger event is a one-step menu selection using a graphical user interface of the mobile device.

7. The method of claim 5, wherein the step of distributing the files to the recipient devices further comprises sending an email message to the recipient devices, inviting the users of the recipient devices to download the files by clicking a download link in the email message.

8. The method of claim 5, wherein the step of distributing the files to the recipient devices further comprises sending the files as attachments to an email message.

9. The method of claim 1, wherein the Web site interface, used for configuring folders and other settings, is accessible via an Internet connection from a Web browser residing on a computer having a convenient user interface.

10. The method of claim 1, wherein the files that are transferred from said mobile device to said remote server are chosen by determining which files on said mobile device are new and need to be included in said file distribution.

11. The method of claim 1, wherein the list of one or more recipient devices is configured on said remote server using a Web browser residing on a computer having a convenient user interface.

12. The method of claim 1, wherein the transfer of said files from said mobile device to said remote server includes the steps of:
  initiating said transfer with a single step by said user of said mobile device;
  determining which files are new and including them in said; and
  retrieving the list of said recipient devices from said remote server without any further action on the part of said user of said mobile device; and wherein the transfer of said files from said remote server to said recipient devices further includes the step of:
    the configuration of the list of said recipient devices further includes a step of:
      configuring the list of said recipient devices on said remote server through a Web browser using an Internet connection.

13. The method of claim 1, wherein at least one of said recipient devices is a second Internet-enabled mobile device.

14. The method of claim 1, wherein said files comprise at least one of the following, or a combination of more than one of the following: video playback data, audio playback data, images, HTML pages, text data, Flash player data, databases, and executable code.

15. The method of claim 1, wherein the files transferred between one or more folders on the mobile device and the corresponding mapped folders on said remote server, the files distributed to one or more recipient devices from the server, and said recipient device addresses transferred to said remote server are encrypted.

16. A system for seamlessly distributing files stored in a plurality of folders in an Internet-enabled mobile device to one or more recipient devices, comprising:
  an Internet-enabled mobile device;
  a mobile application residing on said mobile device;
  a remote server, linkable to said mobile device by an Internet connection, and said remote server including a Web Server software; and
  a Web application residing on said remote server, a database associated with said remote server, said mobile application on said mobile device, a set of user-defined trigger events selected on said mobile device, said Web application and the Web server software on said remote server, and said database interacting with one another to extract one or more recipient device addresses from a contact data organizer on said mobile device, associate one or more of said recipient device addresses with each of one or more files in a folder structure on said mobile device based on the structure of said folders, and distribute files to one or more recipient devices with said recipient device addresses upon the occurrence of one of said user-defined trigger events.

17. The system of claim 16, further comprising a Web site interface on said remote server for configuring said association of said recipient device addresses with said files.

18. The system of claim 17, further comprising a computer having a convenient user interface and a Web browser, so that the Web site interface for configuring the folders can be accessed from the Web browser using an Internet connection.

19. The system of claim 16, wherein said mobile application further comprises a user data parser module, a file handling module, a folder replicating module, a file synchronizing module, and a graphical user interface module.

20. The system of claim 16, wherein:
  said Web application further comprises a user authentication module, a file handling module, a user data handling module, and a graphical user interface module accessible from a Web browser; and
  said database further comprises data on folder structure, file paths, and folder configuration of users.

21. The system of claim 16, wherein the trigger event is a one-step menu selection using a graphical user interface of said mobile device.

22. The system of claim 16, wherein the mobile device further includes a file capturing device.

23. The system of claim 16, wherein the files that are transferred from said mobile device to said remote server are chosen by determining which files on said mobile device are new and need to be included in said file distribution, with no additional action required by said user of said mobile device.

24. The system of claim 16, wherein a list of one or more recipient devices is configured on said remote server using a Web browser residing on a computer having a convenient user interface.

25. The system of claim 16, wherein the transfer of said files from said mobile device to said remote server includes the steps of:
  initiating said transfer with a single step by said user of said mobile device;
  determining which files are new and including them in said transfer; and
  retrieving the list of said recipient devices from said remote server without any further action on the part of said user of said mobile device; and
  the configuration of the list of said recipient devices further includes a step of:
  configuring the list of said recipient devices on said remote server through a Web browser using an Internet connection.

26. The system of claim 16, wherein at least one of said recipient devices is a second Internet-enabled mobile device.

27. The system of claim 16, wherein said files comprise at least one of the following, or a combination of more than one of the following: video playback data, audio playback data, images, HTML pages, text data, Flash player data, databases, and executable code.

28. The system of claim 16, wherein the files distributed to one or more recipient devices are encrypted.

29. A system for seamlessly distributing files from a mobile device to one or more recipient devices, comprising:
   a mobile device;
   a remote server wirelessly connectable to said mobile device;
   means for replicating and mapping a folder structure of a user on said mobile device and a folder structure of the user on said remote server;
   means for transferring files between the folders on said mobile device and the folders on said remote server;
   means for extracting one or more recipient device addresses from a contact data organizer on said mobile source device and transferring said recipient device addresses to said remote server;
   means for associating one or more of said recipient device addresses with each of said files based on the structure of said mapped folders; and
   means for using said recipient device addresses to distribute said files to one or more recipient devices from the server upon the occurrence of a user-selected trigger event.

30. The system of claim 29, wherein said mobile device further comprises a file capturing means.

31. The system of claim 29, further comprising:
   means for configuring a folder and other settings using a Web site interface.

32. The system of claim 31, further comprising:
   a computer having a user interface;
      means for extracting the email addresses of the potential recipient devices from a contact data organizer software residing on said computer; and
      means for transferring the email addresses to a database associated with said remote server.

33. The system of claim 32, further comprising:
   means for replicating and mapping the folder structure on said mobile device and the folder structure on said remote server with a corresponding folder structure on said computer;
   means for transferring the files between the folder on said mobile device and a corresponding folder on said computer using an electromagnetic signal; and
   means for transferring the files between the folder on said computer and the corresponding folder on said remote server using an Internet connection, the folders on said mobile device, said computer, and said remote server being mapped to one another.

34. A non-transitory computer-readable medium having a computer program stored thereupon, said computer program comprising computer readable instructions for cooperating with a media reader to cause a computer processor to perform the steps of:
   replicating and mapping a folder structure of a user on a mobile device and a folder structure of the user on a remote server;
   transferring files seamlessly between the mobile device and said remote server;
   extracting one or more recipient device addresses from a contact data organizer on said mobile source device and transferring said recipient device addresses to said remote server;
   configuring a folder using a Web site interface;
   associating one or more of said recipient device addresses with each of files in said folder based on the structure of said folder; and
   using said recipient device addresses to automatically distribute said files seamlessly in a folder to one or more recipient devices from said remote server upon the occurrence of a user-selected trigger event.

* * * * *